United States Patent Office 3,686,064
Patented Aug. 22, 1972

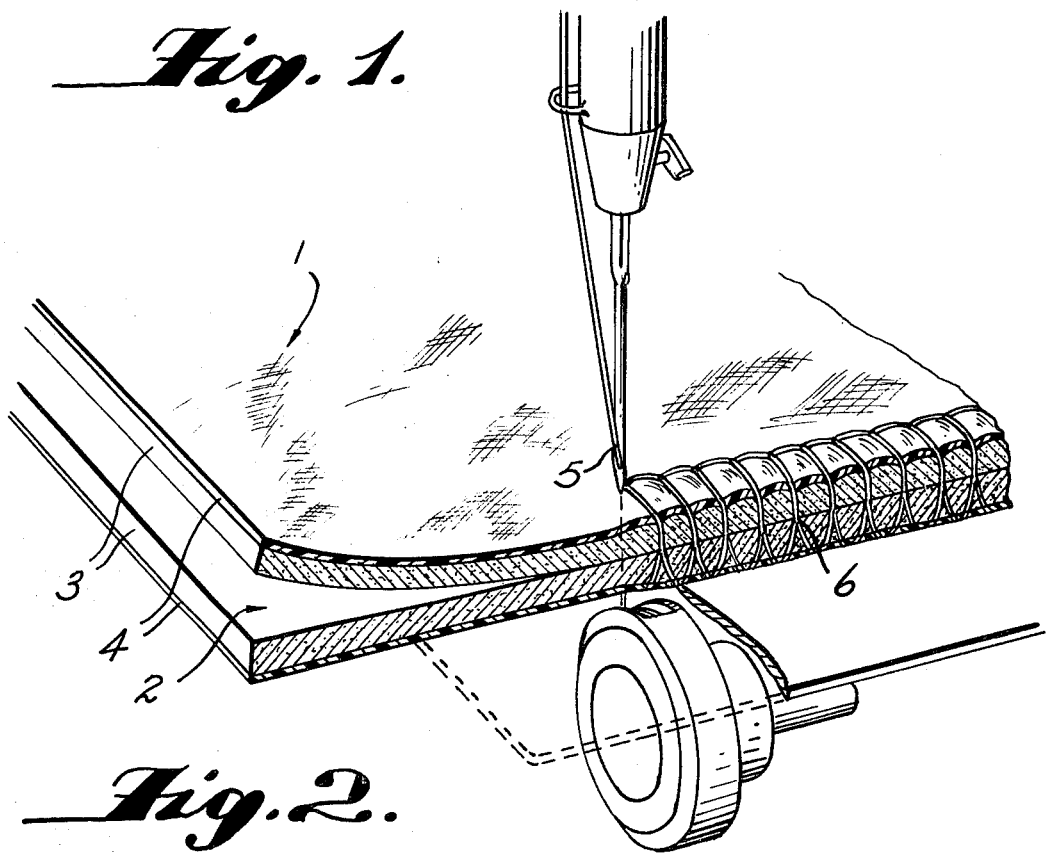
Fig. 1.
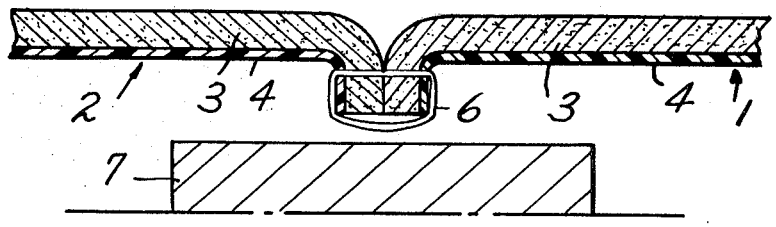
Fig. 3.
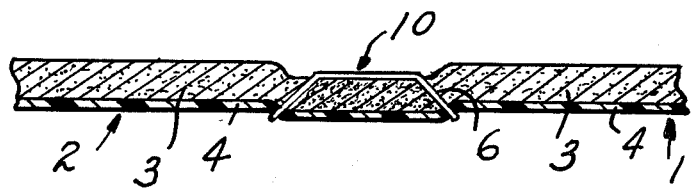

3,686,064
WATERPROOF ARTICLE FOR USE IN
SUBMARINE DIVING GARMENTS
Henri Camille Bonnet, 6 Rue Denave, 69 Tarare, France,
and Jean Edmond Chabert, 10 Avenue Croze, Magnan
13, Marseille 8°, France
Filed Sept. 23, 1969, Ser. No. 860,333
Claims priority, application France, Sept. 23, 1968,
167,214
Int. Cl. B32b 7/08
U.S. Cl. 161—89
1 Claim

ABSTRACT OF THE DISCLOSURE

An essentially waterproof article in sheet form for use in producing submarine diving garments comprises a flexible foam of closed cell polyvinyl chloride plasticized with a plasticizer which is insoluble in hydrocarbons, not extractable by dissolving in water and not hydrolysable. The plasticizer can be an adipate, a sebacate, a phthalate, a sulfonate, a phosphate or a polyester.

The present invention relates to submarine diving garments intended for thermal insulation of the diver's body to prevent his chilling in the course of long dives, especially in cold waters.

Most garments for submarine diving are presently made with use of sheets of foamed synthetic rubber, e.g., neoprene or polychloroprene, bonded on one or both surfaces with a textile support.

These garments do not afford entire satisfaction because they are only moderately effective as thermal insulation and because foamed rubbers are relatively fragile and subject to tearing. Additionally, manufacturing processes for foamed rubber base garments are relatively complicated because almost all of them entail the pasting of strips to receive stitching and this requires a substantial work outlay. Moreover, the garments can only be made black or grey.

Production of submarine diving garments of foamed chlorosulfonated polyethylene is also known, e.g., of a foamed product known under the trademark "Hypalon." However, these foams have the disadvantage of being unweldable, or unbondable, or of being very difficult to weld or bond.

The present invention relates to a new industrial product comprising a material for the manufacture of submarine diving garments, characterized in that it is made of a sheet of foamed polyvinyl chloride which is flexible and which presents closed cells, the sheet being bonded on at least one of its surfaces to a textile support such as jersey tricot.

In accordance with a preferred embodiment of the invention, there is used as plasticizer for the polyvinyl chloride, a substance that is insoluble in hydrocarbons, and that cannot be extracted by dissolving in water, the said substance being unhydrolyzable. Such a plasticizer can be constituted, for example, by substances from the following group: polyester plasticizers such as polyadipates, polysebacates or polyphthalates, nitrile rubber and polyurethane plasticizers.

According to another embodiment of the invention, a conventional plasticizer of polyvinyl chloride can be selected, and the polyvinyl chloride can be insulated from the action of water and hydrocarbons by application onto the foamed sheet of a lacquer, e.g., polyurethane base lacquer.

In a modification, it is possible to produce a material of the invention by bonding a layer of foamed polyvinyl chloride whose plasticizer is insoluble in hydrocarbons and which is not extractable in water and not hydrolyzable onto a polyvinyl chloride which contains a conventional plasticizer.

Finally, in certain cases, it is possible to use PVC foams with conventional plasticizers in certain cases, for production of submarine diving garments.

The application, according to the invention, of sheets of foamed polyvinyl chloride to the production of diving garments offers certain advantages. First of all, the thermal insulation is better than that obtained with products formerly known. The waterproof properties are also increased as well as the strength, particularly abrasion-resistance. Finally, the manufacture of garments is facilitated because the polyvinyl chloride sheets of the invention are heat-weldable.

The textile support that is bonded ont oat least one surface of the foamed polyvinyl chloride can be, e.g., single jersey tricot made with polyamide yarn number 80 to 200 denier which has been texturized to obtain a bulk yarn. Such a textile produce can be deformed in both directions on the one hand because of the method of knitting and on the other hand because of the essential elasticity of the yarn. It is noted that bulk yarn is prepared by imparting a supertwist to a yarn as it comes from the spinning, the supertwist in one direction being followed by thermal fixation and untwisting.

The present invention likewise relates to the new product of manufacture which constitutes a submarine diving garment characterized in that the garment is made from flexible closed-cell foamed polyvinyl chloride sheet as described above.

The present invention also relates to a new process for the manufacture of submarine diving garments, applicable particularly but not exclusively to submarine diving garments as described above. The process is characterized in that the different pieces of thermo-weldable products that are to be assembled to constitute the garment are first sewed edge-to-edge along their selvage and then folded down into the position that they are to have when the garment is used, the seam zone being subsequently crushed and subjected to the action of heat to effect its flattening and heat-welding of the material that constitutes the two sheets.

In a preferred embodiment of the invention, sheets of foamed polyvinyl chloride are used which are coated on the surface that is to constitute the inside of the garment with a tricot of synthetic yarn, e.g., jersey made of the product known in the trade as nylon. The edge seam is effected by placing tht two pieces so that the uncoated surfaces are superimposed.

The seam can advantageously be effected by overcasting, the threads on the one hand passing through the thickness of the two pieces that are to be assembled, and on the other hand passing around the two edges of the said sheets.

The welding of the edges can be effected by a high frequency current device between two electrodes. Advantageously, the electrode on the inner surface of the garment is wider than the other electrode which is preferably of a rounded configuration. In this way, a total flattening of the seam zone is attained, on which a welding of the two parts of the material is effected.

The assembling of the various parts of the garment, according to the invention, is thus done simply and rapidly, with great solidity through the conjunction of the stitching and the welding of the selvages. Additionally, this process for the manufacture of the garment is much simpler and more economical than previously known processes because the construction of the garment is effected by a simple conventional stitching and it is not necessary to paste strips onto the seams as in the case of most of the garments presently manufactured.

Finally, the present invention relates to the industrial product comprising a submarine diving garment made according to the above-described process.

For better comprehension of the invention, several embodiments are presented hereinafter as non-limiting examples.

EXAMPLE 1

To make a fabric for submarine diving garment, the mixture is made cold, parts being by weight in the below table unless otherwise stated.

After dispersion in a belt or blade mixer, the product is placed in a Banbury type mixer and mixed until the temperature reaches 130° C.

The mixture is discharged onto a cylinder mixer and stored at 135° C.

From this mixer a continuous strip is withdrawn, to feed a calender with four cylinders whose temperatures, respectively, are set at 150, 136, 139 and 142° C.

| Material | Parts | Sold under the designation | Supplier |
|---|---|---|---|
| PVC KWert 58 | 50 | Lucovyl AB 8010 | Pechiney St. Gobain. |
| Nitrile rubber | 50 | Hycar 1411 | Polyplastic. |
| Alkyl aryl sulfonate | 75 | Mesamoll | Bayer. |
| Azodicarbonamide | 3.5 | Genitron AC 2 | Graham. |
| Lead salt | 3.5 | Dibasic lead phthalate | |
| Barium cadmium salt | 1.5 | Polyfix II | Polytitan. |

There is thus obtained a sheet which is then backed by passage between an unpolished granular roll and a backing roll, receiving a support of bulked tricot jersey weighing 90 g. to the square meter, made with a polyamide 66 yarn, 70 deniers, texturized by a conventional process.

The product is cooled and then rolled on a mandrel.

It is then unrolled on a non-stick support such as silicone paper, the jersey being toward the outside.

The product is then passed through a 9 meter long tunnel furnace heated to 185° C. at a rate of 5 meters per minute.

A foamed sheet is thus obtained which can be used directly for the making of submarine diving garments.

This product is strongly resistant to sea water and to hydrocarbons.

EXAMPLE 2

The process of Example 1 was repeated using a mixture having the following composition:

| Material | Parts | Sold under the designation | Supplier |
|---|---|---|---|
| PVC suspension KWert 58 | 50 | Solvic 223 | Solvic. |
| PVC suspension KWert 64 | 50 | Solvic 229 | Do. |
| Octyl adipate 57 | | Adipate Octyle | Melle Benzons. |
| Butyl-benzyl phthalate | 5 | Santiciser 160 | Monsanto. |
| Azodicarbonamide | 4.5 | Kempore 200 | Graham. |
| Antimony oxide | 3 | | |
| Ba/Cd salt | 1.5 | Polyfix II | Polytitan. |
| Do | 3.7 | Polyfix 55G | Do. | for bonding onto a jersey tricot weighing 80 g./m.²

EXAMPLE 3

The process of Example 1 was repeated using the following mixtures:

Material: Parts
- PVC suspension KWert 50 _____ 25
- PVC suspension KWert 64 _____ 33
- Nitrile rubber _____ [1] 42
- Octyl adipate _____ 52
- Benzyl-butyl phthalate _____ 5
- Azodicarbonamide _____ 4.5
- Ba/Cd salt _____ 1.5
- Ba/Cd salt _____ 3.7
- Antimony oxide _____ 3

[1] Sold under the designation Hycar 513, by Polyplastic.

The bonding was effected with a polyester yarn tricot, 120 denier yarn weighing 100 g./m.² with elongation in the weft direction and 90% in the warp direction.

EXAMPLE 4

The process of Example 1 was repeated with a composition of the following formula:

Material: Parts
- PVC suspension KWert 58 _____ 50
- PVC suspension KWert 64 _____ 50
- Octyl adipate _____ 20
- Polyester _____ [1] 70
- Azodicarbonamide _____ 4.5
- Ba/Cd salt _____ 1.5
- Ba/Cd salt _____ 3.7
- Antimony oxide _____ 3

[1] Sold under the designation of Scadoplast RA 10 by Carbonal and Jacquemot.

EXAMPLE 5

In a Werner mixer, the following composition was mixed:

Material: Parts
- PVC emulsion KWert 69 _____ [1] 100
- Octyl adipate _____ 100
- Azodicarbonamide _____ 2
- Lead salt _____ [2] 10

[1] Sold under the designation of Solvic 334 by Solvic.
[2] Sold under the designation Dythal by Melle Benzons Company.

The paste thus prepared is taken up on a coating apparatus with two heads. With use of a scraper, the paste is applied to transfer paper. The major part of the paste is furnished by the first head, and then it is gelled at the second head.

About 100 g. paste per square meter is applied.

Before entrance to the tunnel furnace, a support is applied comprising a jersey trico of acrylic yarn, 70 deniers, weight 80 g./m.² with weft elongation of 60% and warp elongation of 50%.

The product passes through the 9 meter long tunnel furnace at a rate of 5 meters per minute, the furnace having a temperature of 190° C.

EXAMPLE 6

The process of Example 5 was repeated with a mixture of the following composition:

Material: Parts
- PVC emulsion KWert 69 _____ 100
- Alkyl aryl sulfonate _____ [1] 100
- Azodicarbonamide _____ 2
- Lead salt _____ [2] 10

[1] Sold under the designation Mesamoll by Sogep.
[2] Sold under the designation of lead dibasic phthalate.

EXAMPLE 7

The process of Example 5 was repeated with a mixture of the following composition:

| Material: | Parts |
|---|---|
| PVC emulsion KWert 69 | 100 |
| Octyl adipate | 85 |
| Nitrile rubber | [1] 20 |
| Azodicarbonamide | 2 |
| Lead salt | 10 |

[1] Sold under the designation Hycar 1312 by Polyplastic.

EXAMPLE 8

The product prepared according to any of Examples 2 to 7 was taken up on a varnisher where there was applied to it either by a thousand-line cylinder or by a scraper, in air, a varnish of the following composition:

| Material: | Parts |
|---|---|
| Polyurethane | [1] 20 |
| Methyl ethyl ketone | 100 |
| Silica gel | [2] 2.5 |

[1] Sold under the designation Estane 5740 by Polyplastic.
[2] Sold under the designation Syloid 978 by Omya Company.

The varnished product was passed through a 2 meter long tunnel furnace heated to 100° C. at the rate of 6 meters per minute.

This coating imparted to the foam a very good resistance to scratching and to hydrocarbons.

EXAMPLE 9

The product prepared as in any of Examples 2 to 7 was taken up on a coating apparatus with which there was applied to the foam, using a scraper, a layer of paste of the following formula:

| Material: | Parts |
|---|---|
| Polyvinyl acetochloride | [1] 100 |
| Tricresyl phosphate | 100 |
| Ba/Cd salt | 2 |
| Silica gel | [2] 0.8 |

[1] Sold under the designation Lucovyl PA 1302 by Pechiney Company.
[2] Sold under the designation Syloid 79.

The product was then passed through the utnnel furnace at 120° C.

A product was obtained which presented very good resistance to sea water.

EXAMPLE 10

The product as prepared according to any of Examples 2 to 7 was taken up on a liner, and there was applied against the said product, using a paste as described in Example 9, a 8/100 millimeter sheet previously calendered which was obtained from the following mixture:

| Material: | Parts |
|---|---|
| PVC mass KWert 63 | [1] 100 |
| Octyl adipate | 80 |
| Ba/Cd salt | 3 |
| Silica gel | [2] 0.8 |

[1] Sold under the designation Lucovyl GB 9550 by Pechiney.
[2] Sold under the designation Syloid 978.

The backing was effected by passage on a cylinder heated to 120° C. at a pressure of 1 kilo/cm.²

A product was obtained which presented very good resistance to sea water.

There is shown in the attached drawing an example of the production of submarine diving garments according to the invention.

In this drawing:

FIG. 1 is a view in perspective showing how the stitching of the two pieces that are to be assembled is effected.

FIG. 2 is a schematic view in section showing how the two pieces of fabric that have been stitched are placed between the two electrodes of a high frequency welding machine; and FIG. 3 is a schematic view in section, showing the two pieces after assembly.

In FIG. 1, two pieces 1 and 2 of sheet prepared, for example, according to one of the above-described procedures are shown. Each sheet has a layer 3 of a foam of a thermo-weldable product such as polyvinyl chloride on which there is heat bonded a textile support 4 which is extensible in both directions, constituted of, e.g., a jersey of synthetic yarn.

Pieces 1 and 2 are cut out according to the outlines that correspond to the structure of the garment that is to be produced, and they are placed back to back, textile support 4 being on the outside and the edges to be joined being juxtaposed.

Using a sewing machine schematically represented by its needle 5, stitching is effected along the edges. This stitching can advantageously be made using a synthetic yarn such as polyamide yarn. The stitching can be overcast—i.e., a stitch with threads 6 that pass around the edges.

All pieces that comprise the garment of the invention can thus be assembled easily and rapidly with use of a conventional machine.

For the welding of the various pieces, a high frequency welding machine is used, as shown schematically in FIG. 2, which comprises a flat lower electrode 7 which holds the support and an upper electrode 8 which can be applied with a certain amount of force against electrode 7, and whose lower edges 9 are rounded. Electrode 8 can have a width of, e.g., 6 to 7 mm., but this is not a requirement.

The two pieces 1 and 2 which have been assembled by stitching, as explained above, are then placed with the textile support 4 toward electrode 7 and the line of stitching substantially in alignment with electrode 8 which has a certain length, e.g., about 10 or 15 cm.

The electrodes are then brough together for the welding of the two edges, which allows production of an assembly, as shown in FIG. 3, in which the inside surface of the garment that comprises textile support 4 is practically flat whereas the upper surface presents a wide gap 10 whose form corresponds to that of the lower part of electrode 8.

The assembly thus produced has great solidity because of a good weld of the two foam sheets reinforced by the stitching threads.

It is to be noted that even when the stitching threads are cut out, the assembly continues to present excellent solidity. Of course, this elimination of the sewing threads should only be done for the purpose of checking the quality of the web.

It is understood that the embodiments that have been presented above are not intended to be limiting and may be modified in various ways without going beyond the scope of the invention. In particular, it is clear that, although it is described with reference to submarine diving garments, the invention concerns any type of garment that might be made with the same materials, particularly garments for aquatic sports. Similarly, the assembly process that has been described above applies not only to foamed PVC materials but also to the assembly of any materials which can be heat welded. Finally, the materials that can be used according to the invention may or may not comprise textile coverings on one or both sides, and also they can be made in any color, which was not the case when synthetic rubber materials were used.

The scope of the invention is defined in the following claim wherein:

1. An essentially water-proof heat weldable, article in sheet form for use in producing a submarine diving garment, said article consisting essentially of a flexible, closed cell polyvinyl chloride foam plasticized with a plasticizer which is insoluble in hydrocarbons, not extractable by dissolving in water and not hydrolysable, said plasticizer being selected from the group consisting of adipates, sebacates, phthalates, sulfonates, phosphates and polyesters and being present in amounts of at least 62 parts per 100 parts of said polyvinyl chloride, said sheet of polyvinyl chloride being bonded on one side thereof to a textile material made from polyamide yarn having a denier ranging from 80–200, said textile material constituting the inside of the diving garment made from said article, and being bonded on said other side to a layer of varnish comprising polyurethane and methyl ethyl ketone, said layer of varnish constituting the outside of said diving garment made from said article.

References Cited

UNITED STATES PATENTS

| | | |
|---|---|---|
| 2,964,799 | 12/1960 | Roggi et al. |
| 3,076,206 | 2/1963 | Shaw et al. |
| 3,130,505 | 4/1964 | Markevitch _____ 161—159 |
| 3,228,820 | 1/1966 | Samson _____ 161—160 |
| 3,511,743 | 5/1970 | Rach _____ 161—117 |
| 3,298,856 | 1/1967 | Harding _____ 117—161 KP |

FOREIGN PATENTS

| | | |
|---|---|---|
| 994,914 | 6/1965 | Great Britain _____ 161—159 |

ROBERT F. BURNETT, Primary Examiner

J. J. BELL, Assistant Examiner

U.S. Cl. X.R.

2—2.1 R, 82; 117—161 KP; 156—93, 273; 161—38, 52, 92, 160, 190